United States Patent [19]

Michimae et al.

[11] Patent Number: 4,932,513

[45] Date of Patent: Jun. 12, 1990

[54] HOPPER FOR CONTINUOUSLY AND AUTOMATICALLY DRAWING OUT TIRES THROUGH A WATER TANK

[75] Inventors: Kiyoharu Michimae; Akira Amamiya, both of Takaoka, Japan; Hiroshi Akimoto, Fort Lee, N.J.

[73] Assignees: The Brook Club, Inc., Haydenville, Mass.; Michimae Chikuru Kogyo Kabushiki Kaisha, Takaoko, Japan

[21] Appl. No.: 253,406

[22] Filed: Oct. 4, 1988

Related U.S. Application Data

[63] Continuation of Ser. No. 900,376, Aug. 26, 1986, abandoned.

[30] Foreign Application Priority Data

Sep. 2, 1985 [JP] Japan .................. 60-192082

[51] Int. Cl.⁵ .............................. B65G 17/32
[52] U.S. Cl. ............................ 198/397; 198/533; 198/443; 198/487.1; 406/86
[58] Field of Search ............... 198/397, 388, 533, 443, 198/487.1; 134/133, 134, 188, 194; 406/65, 86, 139, 105, 100

[56] References Cited

U.S. PATENT DOCUMENTS

| | | | |
|---|---|---|---|
| 2,581,720 | 1/1952 | Schulte | 198/533 |
| 2,752,926 | 7/1956 | James | 134/133 |
| 2,892,462 | 6/1959 | Ine | 134/133 X |
| 3,517,797 | 6/1970 | Daleffe et al. | 198/397 X |
| 3,924,732 | 12/1975 | Leonard | 198/397 X |
| 4,072,227 | 2/1978 | Nomura et al. | 198/487.1 X |
| 4,099,609 | 7/1978 | Kieronski et al. | 198/397 X |
| 4,567,906 | 2/1986 | Brule | 134/133 X |

FOREIGN PATENT DOCUMENTS

| | | |
|---|---|---|
| 51140389 | 6/1978 | Japan . |
| 52-156313 | 10/1978 | Japan . |
| 53-32916 | 10/1979 | Japan . |
| 55-46350 | 11/1981 | Japan . |
| 56143806 | 3/1983 | Japan . |
| 56143807 | 3/1983 | Japan . |
| 57147199 | 2/1984 | Japan . |

*Primary Examiner*—David A. Bucci
*Assistant Examiner*—D. Glenn Dayoan
*Attorney, Agent, or Firm*—Curtis, Morris & Safford

[57] ABSTRACT

A hopper for continuously drawing out tires through a water tank including at least one line of declining roller conveyors disposed under an opening for charging the tires. A water tank is diposed under the roller conveyors which receives the tires and arranges the tires in a predetermined direction. A plurality of spaced-apart hooks draws the tires up out of the water tank. The pulled up tires are then transported through a slide plate and a belt-conveyor to a predetermined place.

7 Claims, 2 Drawing Sheets

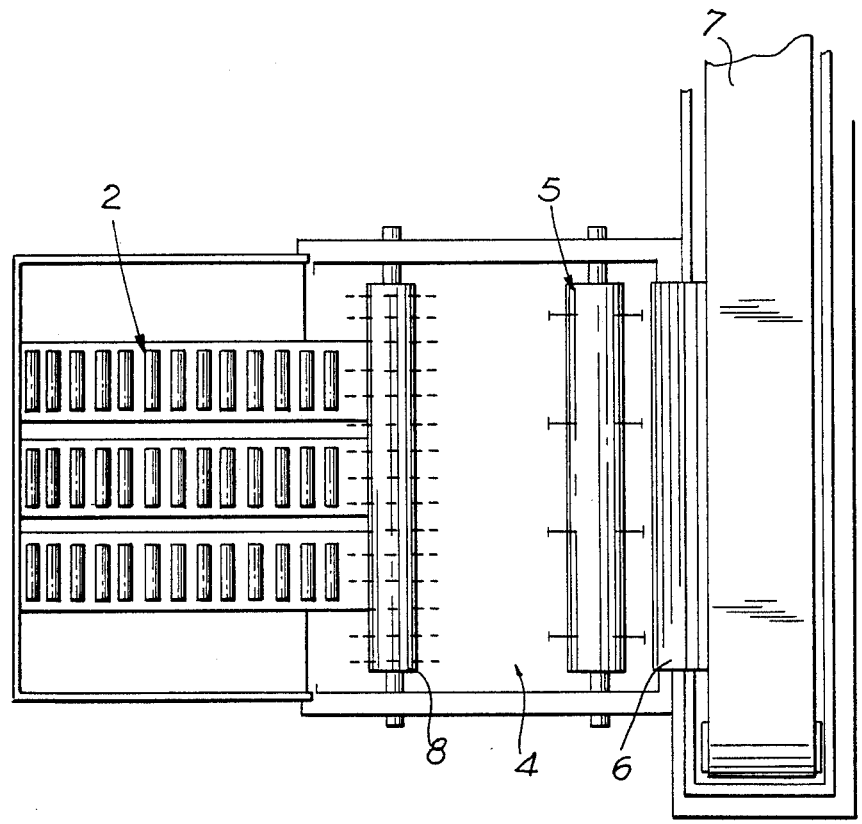
F I G. 2

HOPPER FOR CONTINUOUSLY AND AUTOMATICALLY DRAWING OUT TIRES THROUGH A WATER TANK

This application is a continuation of application Ser. No. 900,376, filed Aug. 26, 1986 ABN.

BACKGROUND OF THE INVENTION

The present invention relates to generally to a hopper for continuously and automatically drawing out tires through a water tank and feeding them, and more particularly to a hopper which can continuously draw out waste rubber tires through a water tank and quantitatively supply the tires to a thermal-decomposing furnace or a chipper for reusing the tires as fuel and the like.

1. Cross Reference to Related Applications

This application is related to copending application Ser. No. 877,323 filed July 23, 1986, now U.S. Pat. No. 4,724,825 copending application Ser. No. 900,365 filed Aug. 26, 1986 now abandoned and copending application Ser. No. 932,146 filed Nov. 17, 1986 now abandoned.

2. Description of the Prior Art

With the recent remarkable increase in the amount of generation of waste rubber tires resulting from the rapid development of the automotive industry, the regeneration and appropriate treatment of these waste tires becomes significant in the areas of resource-saving, energy-saving and preservation of the environment.

With these social needs, researches of regeneration of the waste tires and their industrialization have become more and more active. For example, an apparatus for thermal-decomposing waste rubber tires is disclosed in Japanese Patent Application Nos. 74993/72; 16396/79; 16397/79; and 143806/81.

In the case where the tires are treated in large quantities in a large-sized tire thermal-decomposing furnace or chipper, such a conventional, laborious handworking process is very disadvantageous from a cost standpoint as well as the necessity of continuously feeding the waste tires in large quantities.

It is therefore an object of the present invention to provide an improved automatic type of hopper for continuously drawing out randomly loaded tires which can continuously and quantitatively draw out the tires through a water tank and feed the tires to a succeeding apparatus for treating them, and therefore can save labor.

This and other objects, features and advantages of the present invention may be more clearly understood and appreciated from a view of the following detailed description of the disclosed embodiments and by reference to the appended drawings and claims.

SUMMARY OF THE INVENTION

The hopper for continuously drawing out tires through a water tank according to the present invention comprises at least one line of declining roller conveyors disposed under an opening for charging the tires for sliding down the tires, a water tank disposed under the roller conveyors for receiving the slided down tires and for arranging them in a definite direction, a means for moving the tires arranged in water in a predetermined direction, and a means for drawing up the moved tires from the water tank.

The randomly accumulated tires on the roller conveyors which were thrown from the charging port with a shovel and the like spontaneously slip down the declining roller conveyors having a predetermined angle of downward inclination, for example 15° to 75°, preferably about 30°. The slip down of the tires on the roller conveyors can be promoted by a means for thrusting up the tires provided under the roller conveyors. This means intermittently pushes up each of the tires through the space between two adjacent rollers of respective roller conveyors.

A number of the tires successively slid down the roller conveyors are only lifted out of the water in a tank while keeping their radial direction vertical, and they disperse all over the water surface because they are pushed forward by the subsequently slid down tires.

A means for drawing up the tires out of the water tank has a number of hooks spaced apart and projected in a horizontal direction. Because this tire drawing up means is rotated upwardly in a belt-conveyor system, each of the tires moved near the means are automatically pulled up by the hook engaging the relatively large center opening of the tire. The pulled up tires are transported through a slide plate means and a belt-conveyor to a predetermined place.

BRIEF DESCRIPTION OF THE DRAWINGS

FIG. 2 is a plan view of the hopper shown in FIG. 1.

Figure 1:
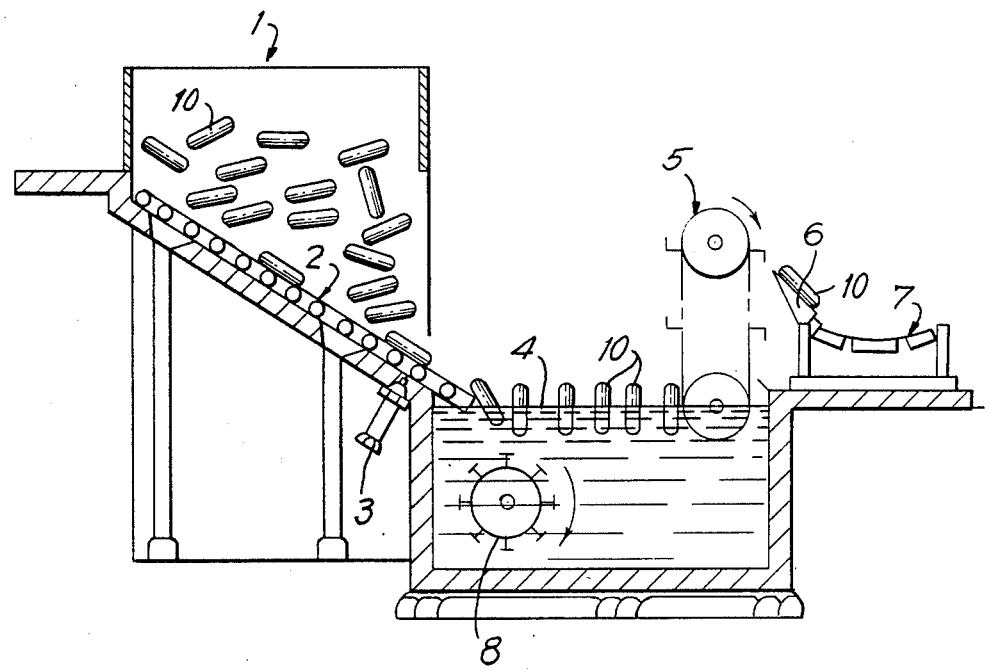
FIG. 1 is a schematic side view of a preferred embodiment of a hopper for continuously drawing out and quantitatively feeding tires according to the present invention.

The following examples are presented for illustrative purposes only and should not be construed as limiting the invention.

DETAILED DESCRIPTION OF THE PREFERRED EMBODIMENTS OF THE INVENTION

Referring to the drawings, in which like numerals indicate like elements throughout the several views, FIG. 1 shows a schematic side view of a hopper for continuously drawing out waste rubber tires and quantitatively feeding them.

The tires 10 are thrown into a housing of the hopper through a charging port 1 with a tire shovel (not shown) and the like. Underneath the charging port 1 are disposed three lines of roller conveyors 2 each having a predetermined angle of downward inclination, for example, ranging from 15° to 75° and preferably about 30°. Numeral 3 represents at least one means for thrusting up the tires which were provided under the roller conveyors 2. Each of these tire thrusting up means 3 can promote the movement of the tires downwardly along the roller conveyors 2 by intermittently engaging each of the tires as the thrusting means moves through the space between two adjacent rollers of the respective line of roller conveyor. Such thrusting or agitating means prevents overlap and/or accumulation of the tires along the conveyors and, in particular, at the lower end of the conveyors, provides a uniform feeding of the tires into a water tank 4.

Under the roller conveyors 2 is disposed a water tank 4. It is desirable that the depth of water filled in the tank 4 is generally about twice to triple the diameter of the tire 10 for facilitating movement of the tires in the water tank. The tires slid down the roller conveyors 2 are slightly lifted out of the water in the tank 4 while keeping their radial direction vertical. The tires disperse all over the water surface while assuming said vertical position naturally due to an amount of the tires thrown into the tank 4, the buoyancy and the falling force of the tire. It is considered that said vertical position of the tires in the water results from the structure and specific gravity (about 1.4 to about 1.8) of the tire. When it is required to increase the dispersing speed of the tires in the water tank 4 and hence to increase the pulling up speed on the tires, a means for promoting the movement of the tires such as a dispersing roller 8 and the like can be provided to intermittently move the tires in the desired direction as shown in FIG. 1. Numeral 5 represents a means for drawing up the tires out of the water tank 4 which is provided on the side wall in the opposite side of the roller conveyors 2. The means 5 for drawing up the tires has a number of hooks spaced apart and projected in a horizontal direction respectively. The tires moved near the tire drawing up means 5 by the dispersing roller 8 are automatically pulled up by this means 5 and then they are continuously and quantitatively fed through a slide plate means 6 and a belt-conveyor 7 to a desired place.

In an example of feeding waste rubber tires to a thermal-decomposing furnace using the above described hopper for continuously drawing out the tires, this hopper could draw out 400 tires/hour by using a roller conveyor 2 having about 3 meter width and a downward slope of about 30°, a water tank 4 having a surface area of 14 m² and a tire drawing up means 5. This work corresponds to that of four workers in a conventional handworking process.

What is claimed is:

1. A hopper for continuously drawing out randomly oriented tires, each having a central opening and being formed of tread, from a port through a water tank, comprising:
   one or more lines of declining roller conveyors disposed under a port for charging the randomly oriented tires;
   a water tank disposed under the lower end of the roller conveyors for receiving the charged tires from the roller conveyors and for arranging the tires without any mechanical intervention in a generally vertical orientation in the water with a portion of the tread of each tire extending out of the water and the water transports the tires in their original form to a means for drawing up the tires from the tank; and
   said means for drawing up the tires including a plurality of hooks spaced-apart in a direction transverse to the direction of tire movement in the water tank and projecting in a horizontal direction which engage the central opening of the tire and thereby moves the tire in a generally vertical position from a start position in the tank to a final position wherein the tires are consecutively and quantitatively removed from the tank.

2. The hopper as set forth in claim 1 and further including one or more means for agitating the tires, thereby promoting the movement of the tires along the roller conveyors by preventing overlap and accumulation of the tires along the conveyors and providing a uniform feeding of the tires into the water tank.

3. The hopper as set forth in claim 1 and further including a means for agitating the water in the tank for promoting the movement of tires in the water tank.

4. A hopper for continuously drawing out tires, each having a central opening and being formed of tread, from a port through a water tank, comprising:
   at least one declining roller conveyor disposed under said port for charging the tires;
   a water tank disposed under the lower end of the roller conveyer for receiving the charged tires therefrom and for arranging the tires in a generally vertical orientation in the water without mechanical intervention in a condition such that a portion of the tread of each tire extends out of the water;
   means for promoting the movement of tires while in said generally vertical orientation in the water tank; and
   means for withdrawing the tires in their original form from the tank including a plurality of hooks spaced-apart in a direction transverse to the direction of tire movement in the water tank and projecting in a horizontal direction which engage the central opening of the tires and provide vertical movement of the tires out of the tank.

5. A method for continuously drawing up tires, each having a central opening and being formed of tread, through a water tank comprising of the steps of:
   loading the randomly oriented tires onto at least one declining roller conveyor;
   discharging the tires from the roller conveyor into a water tank disposed under the lower end of the conveyor;
   arranging the tires in a generally vertical orientation in the tank without mechanical invention;
   transporting the tires in the tank without mechanical intervention in a condition such that a portion of the tread of each tire extends out of the water;
   removing the tires in their original form from the tank by one of a plurality of hooks spacedapart in a direction transverse to the direction of tire movement in the water tank and projecting in a horizontal direction, each hook engaging the central opening on one of the tires and withdrawing the tire from the tank; and
   discharging the tire from the hook at a predetermined location.

6. The method for continuously drawing out tires through a water tank as set forth in claim 5 and further including continually agitating the tires on the conveyor to thereby promote their movement and prevent overlap and accumulation of the tires along the conveyor, to provide a uniform feeding of the tires into the water tank.

7. The method for continuously drawing out tires through a water tank as set forth in claim 5 and further including agitating the water in the tank with a dispersing roller to thereby promote movement of the tires through the tank.

* * * * *